July 19, 1927.  1,636,406
L. K. BRAREN
STOCK FEED
Original Filed Nov. 28, 1922   2 Sheets-Sheet 1
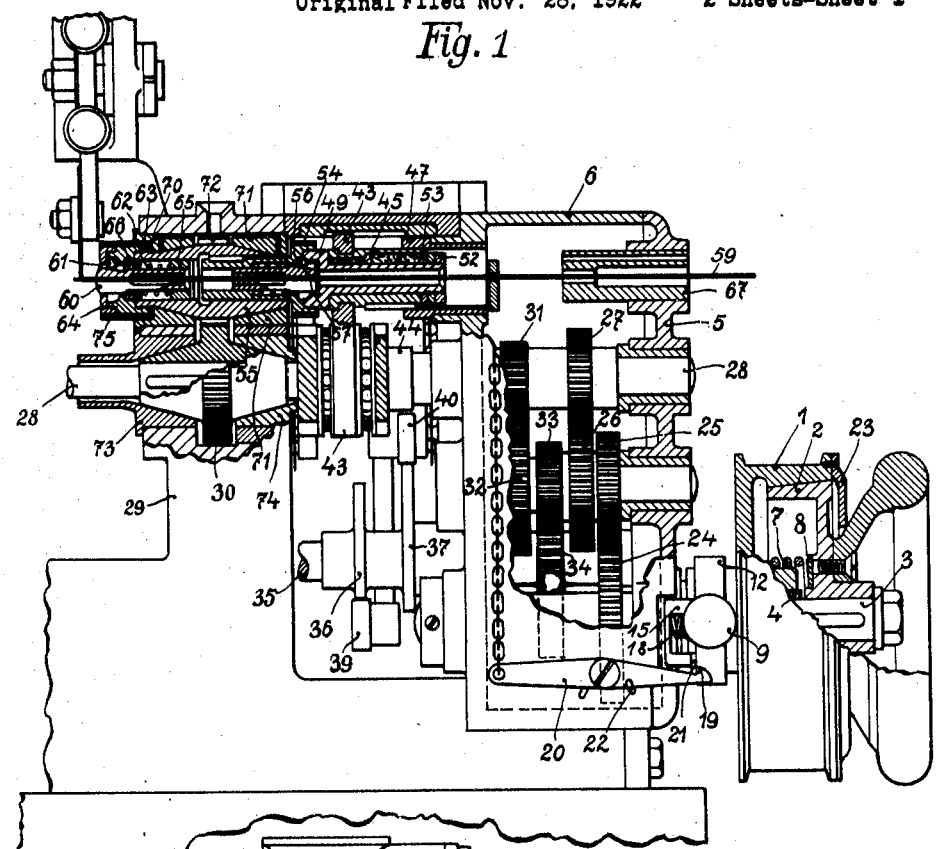
Fig. 1
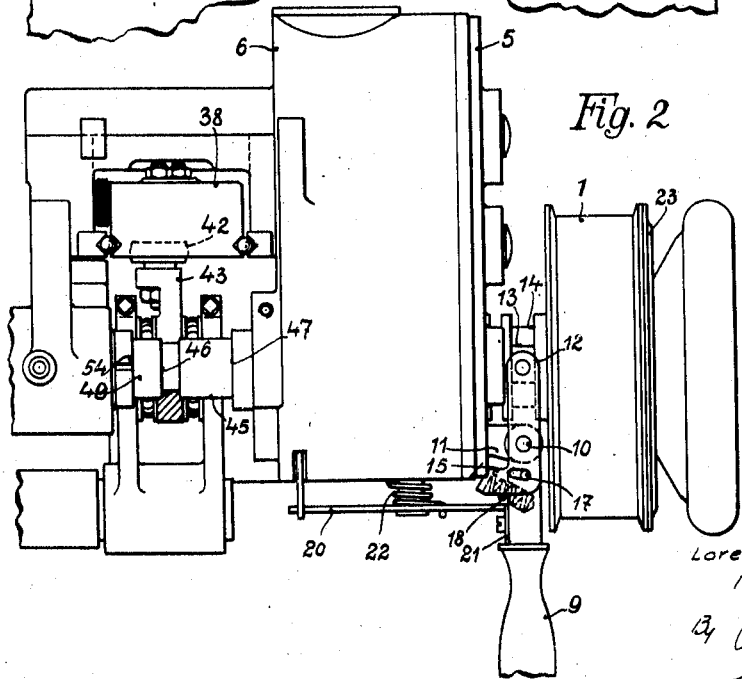
Fig. 2
Fig. 6
Lorenz Konrad Braren
INVENTOR
his ATTY July 19, 1927.

L. K. BRAREN 1,636,406

STOCK FEED

Original Filed Nov. 28, 1922   2 Sheets-Sheet 2

Lorenz Konrad Braren
INVENTOR

Patented July 19, 1927.

1,636,406

UNITED STATES PATENT OFFICE.

LORENZ KONRAD BRAREN, OF MUNICH, GERMANY, ASSIGNOR TO THE FIRM FRIEDRICH DECKEL, FABRIK FÜR PRÄZISIONSMECHANIK UND MASCHINENBAU, OF MUNICH, GERMANY.

STOCK FEED.

Original application filed November 28, 1922, Serial No. 603,871, and in Germany December 18, 1921. Divided and this application filed June 4, 1924. Serial No. 717,714.

The present invention relates to stock feeds for moving automatically a bar of material through a machine and may for instance be employed to advantage in connection with screw making and turning lathes. Such an application is shown and described in my copending application, filed Nov. 28, 1922, Serial No. 603,871. The object of the invention is to provide a mechanism which advances the material only through axial movements without using separate instrumentalities for opening and closing the jaws. This stock feed is designed to permit a very accurate control of the material and is very simple in construction.

Another object of the invention is to provide an improved mechanism for stopping the machine as soon as the bar of material has been used up.
In order that this my invention may be more readily understood reference is made to the accompanying sheets of drawings which show how this invention may be carried into practical effect.
Fig. 1 is a front elevation of an automatic screw machine with my invention applied thereto, partly in section.

Fig. 2 is a top view to Figure 1.

Fig. 6 is a perspective view of the drive clutch engaging lever.

Figure 3:
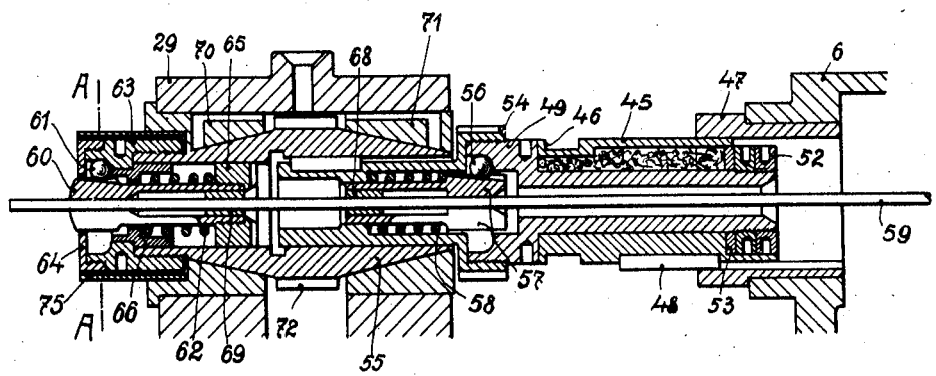
Fig. 3 is a sectional view of the feeding device proper on an enlarged scale.
Figure 5:
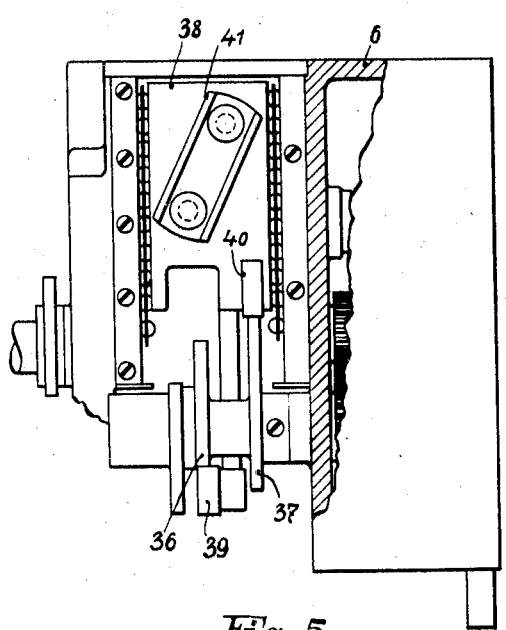
Fig. 5 shows the actuating slide for the feeding device.
Figure 4:
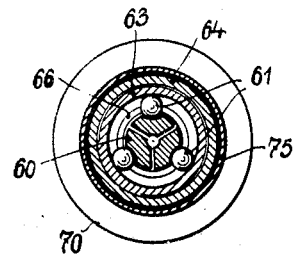
Fig. 4 is a section through a spring collet according to the line A—A in Fig. 3.

Referring to the drawings in which like characters of reference indicate corresponding parts wherever occurring, the driving pulley 1 receives its motion through a belt directly from a pulley on a motor or on a suitable countershaft which drive has not been shown being immaterial to the present invention.
The driving pulley 1 is formed on the inside to mate with a cone clutch 2 which is fastened rigidly to a drive shaft 3. The hub of pulley 1 is bored to turn and slide freely on the outside of a bushing 4 which latter is pressed into a hub of a cover 5 of a gear box 6. A spring 7 tends to hold the coupling out of engagement, a thrust plate 8 being interposed between the spring 7 and the cone clutch 2.

A handle 9 for starting the machine is pivoted on a pin 10 which is fastened in a lug 11 of the gear case cover 5. A lever 12 also pivoting on pin 10, is forked to reach out over a hub of the pulley 1 and carries two sliding shoes 13 fitting in a groove 14 provided in the hub. On the opposite side the lever 12 extends with plate like portions 15 over and under the handle 9, a part 16 connecting these two plates together (see Fig. 6). A pin 17 fastened in the handle 9 passes through a slot in the top plate of the lever 12 and limits the movement of the handle 9 and the lever 12 in relation to each other, a spring 18 tending to force them apart. A nose 19 on the end of a lever 20, which is pivoted to a lug of the gear case 6, can hook under a plate 21 fastened to the handle 9. A spring 22 pulls the lever 20 up against the plate 21.

In order to engage the driving pulley 1 with the cone clutch 2 the handle 9 is pushed towards the left until the nose 19 on the lever 20 can snap upwards under the action of the spring 22 and hook in back of the end of the plate 21 preventing thus the return of the handle 9. The lever 12 moves together with handle 9 until pulley 1 has been brought into contact with the clutch member 2. A further movement of the handle 9 compresses the spring 18 providing thus for the necessary coupling pressure. In order to keep the coefficient of friction in the cone clutch constant a lubricant retainer 23 has been fastened to pulley 1. To stop the machine it is only necessary to push nose 19 downward because the spring 7 tends to return pulley 1, lever 12 and handle 9 to nonrunning position.

The drive shaft 3 transmits the movement from the clutch member through two pair of gears 24, 25 and 26, 27 to a main shaft 28 which is journaled in bearings of the gear case and the gear case cover. This shaft extends over into the main frame 29 of the machine and rotates there a gear 30. Through gearing 31, 32 and 33, 34 movement is being transmitted from the main shaft 28 to a cam shaft 35 on which a double cam 36, 37 has been mounted. These cams reciprocate a slide 38, two rollers 39 and 40 being interposed. On the slide is provided an adjustable guide 41 of channel section. A roller 42 carried by an arm 43 slides in the channel of the guide 41 and is moved crossways by the reciprocating slide, the amount of movement depending on the angular adjustment of the guide. The arm 43 is mounted on a bushing 44 which is journaled coaxially with the main shaft 28 free to slide back and forth. The mechanisms described above are more fully shown and described in my copending application, filed Nov. 28, 1922, Serial No. 603,871. A gooseneck portion of the arm 43 extends around a bushing 45 and fits with two keylike projections into a groove 46 of said bushing transmitting thus the reciprocating movement to the bushing. The latter slides in a bushing 47 pressed into a hub of the gear case 6. The bushing 45 is prevented from turning by a key 48. A tubular part 49 fits rotatably into the bore of the bushing 45, and is located axially by two nuts 52 and a washer 53. Felt inserts in longitudinal holes insure a good lubrication. There is another tubular member 54 screwed over the enlarged end of the part 49 and slidingly located in a bore of the main spindle 55, a key preventing rotation. Part 49 serves as a retainer for three steel balls 56 which fit easily between the faces of the parts 49 and 54 and rest in grooves cut with an incline onto the back of the three jaws of a spring collet 57 which is slidingly located in a bore of the part 54 and which is pressed towards the right by a spring 58 making thus the balls roll up on the inclined grooves, close the jaws of the collet, and grip the rod of material 59. The parts just described are the complete feeding mechanism.

Working together with the feeding mechanism there is provided a material holding spring collet 60, with three balls 61 working in similar inclined grooves of the collet jaws, a spring 62 for closing the jaws and a ball retainer 63. Part 63 is screwed onto the nose of the main spindle 55. A cap 64 serves for holding the balls in place. A nut 65 screwed to the end of the spring collet 64 helps to guide the collet in the bore of the main spindle 55, while a bushing 66 serves the same purpose for the retainer 63 into which it is pressed.

The bar of material 59 is guided loosely on its entrance into the machine in a bushing 67. Guide bushings 68 and 69 which are pressed into the ends of the spring collets 57 and 60 serve especially for steadying material of small diameter. All bushings and collets through which the rod of material is passing are countersunk on the entering side.

The two spring collets are arranged in such a manner that the material may pass through them readily in the feeding direction because end pressure applied in this direction is transmitted by friction to the collet, releasing the balls and allowing the material to slide through easily. Any end pressure in the opposite direction however forces the balls tighter onto the jaws, increasing the grip on the material in ratio with the end pressure applied, with suitable inclination of the grooves locking the rod entirely.

The whole feeding process therefore requires only a movement back and forth of the spring collet 57, which is transmitted through the feed actuating arm 43 as previously described. The material is always held securely by one of the collets thus insuring an exact and uniform feed.

To prevent any end movement of the main spindle 55, there have been provided two bearings 70 and 71 with a tapering bore of which the former is pressed into, while the second is held adjustably by screws in hubs of the main frame 29. On the central portion of the main spindle teeth 72 have been cut in engagement with the gear 30, which is driven by the main shaft 28 and supported by two bearings 73 and 74 with similar tapering bores as the bearings 70 and 71 have. To prevent the lubricant, which is thrown in large volume onto the material and the cutting tools, from being thrown off by the fast rotating spindle an oil guard 75 is pushed into a corresponding recess in the bearing 70, a T slot being cut into the oilguard to effect a slightly springing action.

Having now fully explained my invention I do not wish to be understood as limiting myself to the exact details of construction as obviously many modifications will occur to a person skilled in the art.

What I claim is:

1. In turning and screw cutting machines, a stock feed comprising a stationary automatic gripping device operated by the movement of the stock in one direction to grip and hold the same, and upon movement in the opposite direction to release the same, a movable automatic feeding mechanism including jaws frictionally engaging the stock and operated thereby during movement in one direction to grip and advance the stock, and adapted upon movement in the opposite direction to slide along the same and also including a reciprocally mounted non-rotatable tubular part encircling the jaws and serving to force the latter into frictional engagement with the stock, and means for reciprocating said tubular part to feed the stock through said gripping device during movement in one direction, and arranged to move it idly along the stock during movement in the other direction while the stock is held by said gripping devices.

2. A stock feed, gripping mechanism, comprising a spring collet, steel balls located in inclined grooves on the back of the jaws of said spring collet, a ball retainer and a spring, said spring making the balls roll up in the inclined grooves and clamp the jaws onto the material.

3. In a stock feed a gripping mechanism comprising a spring collet, having a plurality of jaws and an inclined groove on the back of each jaw, steel balls arranged to operate in said inclined grooves and means for causing said balls to roll up in said inclined grooves and clamp the rod of material.

4. In a stock feed a gripping mechanism comprising a member for gripping the bar of stock, a plurality of rolling elements in contact with said gripping member, a container for said rolling elements and means for causing said rolling elements to force said gripping member onto the bar of stock.

5. In a stock feed a gripping mechanism comprising a member for gripping the bar of stock, inclined surfaces on said gripping member, rolling elements operating on said inclined surfaces and a container for said rolling elements.

6. In a stock feed a gripping mechanism comprising a member for gripping the bar of material, inclined surfaces on said gripping member, an external race, rolling elements operating between said external race and said gripping member on said inclined surfaces and means for causing said rolling elements to run up on said inclined surfaces.

7. In a stock feed a gripping mechanism comprising a spring collet provided with movable jaws, inclined surfaces on the back of the jaws of said spring collet, a race, rolling elements operating between said race and said spring collet on said inclined surfaces, means for causing a relative movement between said rolling elements and said spring collet and different means for limiting the movement of said rolling elements.

8. In a stock feed, a gripping mechanism comprising a collet provided with spring jaws, a race about said collet, rolling elements between said race and collet jaws, said race and jaws having relatively inclined surfaces operating upon relative movement therebetween to close said jaws to grip the stock, spring actuated means tending to effect a relative movement of said parts to close said jaws, and means for causing a relative movement between said stock and jaws to operate the latter by the frictional engagement therebetween, during movement in one direction.

9. In a stock feed, a pair of gripping mechanisms each comprising a collet having spring jaws, a race about said jaws having a surface inclined relatively to the surface of said jaws, rolling elements between said surfaces, a spring operating between said race and jaws tending to move said parts to close said jaws, said gripping mechanisms having frictional engagement with the stock, and being arranged for operation by such frictional engagement to cause said jaws to grip the stock during movement in opposite directions respectively, and means for reciprocating one of said gripping mechanisms for idle movement along the stock while the latter is held by the other of said mechanisms and for gripping and advancing the stock during movement in the opposite direction.

In testimony whereof I affix my signature.

LORENZ KONRAD BRAREN.